United States Patent
Nagata et al.

(10) Patent No.: US 9,690,356 B2
(45) Date of Patent: Jun. 27, 2017

(54) METHOD AND APPARATUS FOR REDUCING POWER CONSUMPTION OF A PROCESSOR

(71) Applicant: LENOVO (SINGAPORE) PTE. LTD., Singapore (SG)

(72) Inventors: Nozomu Nagata, Kanagawa-Ken (JP); Shigefumi Odaohhara, Kanagawa-Ken (JP)

(73) Assignee: LENOVO (SINGAPORE) PTE LTD, Singapore (SG)

( * ) Notice: Subject to any disclaimer, the term of this patent is extended or adjusted under 35 U.S.C. 154(b) by 449 days.

(21) Appl. No.: 13/744,656

(22) Filed: Jan. 18, 2013

(65) Prior Publication Data

US 2013/0232357 A1     Sep. 5, 2013

(30) Foreign Application Priority Data

Mar. 3, 2012   (JP) .................................. 2012-047446

(51) Int. Cl.
| | |
|---|---|
| *G06F 1/00* | (2006.01) |
| *G06F 1/32* | (2006.01) |
| *G06F 1/20* | (2006.01) |
| *G06F 1/28* | (2006.01) |

(52) U.S. Cl.
CPC .............. *G06F 1/324* (2013.01); *G06F 1/206* (2013.01); *G06F 1/28* (2013.01); *Y02B 60/1217* (2013.01); *Y02B 60/1275* (2013.01)

(58) Field of Classification Search
CPC .................................... G06F 1/324; G06F 1/28
USPC .................................................. 713/322, 300
See application file for complete search history.

(56) References Cited

U.S. PATENT DOCUMENTS

| | | | | |
|---|---|---|---|---|
| 6,472,848 | B2* | 10/2002 | Stryker et al. ................ | 320/135 |
| 2004/0236969 | A1* | 11/2004 | Lippert et al. ................ | 713/300 |
| 2005/0068008 | A1* | 3/2005 | Zhang ............................ | 320/134 |
| 2008/0304199 | A1* | 12/2008 | Cruise et al. ................. | 361/101 |
| 2011/0068746 | A1* | 3/2011 | Rocci et al. ................... | 320/118 |
| 2011/0234189 | A1* | 9/2011 | Tanihara ............... | H02M 3/156 |
| | | | | 323/282 |

FOREIGN PATENT DOCUMENTS

| | | |
|---|---|---|
| JP | 10-124168 | 5/1998 |
| JP | 10-268986 | 10/1998 |
| JP | 2000-330675 | 11/2000 |
| JP | 2003-244857 | 8/2003 |
| JP | 2007-072962 | 3/2007 |

(Continued)

*Primary Examiner* — Robert Cassity
(74) *Attorney, Agent, or Firm* — Antony P. Ng; Russell Ng PLLC

(57) ABSTRACT

A method for controlling the clock frequency of a processor while suppressing performance degradation is disclosed. The processor receives power from a battery to operate at a high clock frequency HFM(f) or a low clock frequency LFM(f). An allowable current Im is set for the discharge current of the battery. The time during which the processor operates at the HFM(f) and the time during which the processor operates at the LFM(f) are controlled by PWM. As the feedback current Ifb increases, the time during which the processor operates at the LFM(f) become longer than the time during which the processor operates at the HFM(f).

6 Claims, 8 Drawing Sheets

(56) References Cited

FOREIGN PATENT DOCUMENTS

| JP | 2007-233782 | 9/2007 |
|----|-------------|--------|
| JP | 2008-538020 | 10/2008 |
| JP | 2011-101573 | 5/2011 |

* cited by examiner

US 9,690,356 B2

METHOD AND APPARATUS FOR REDUCING POWER CONSUMPTION OF A PROCESSOR

PRIORITY CLAIM

The present application claims benefit of priority under 35 U.S.C. §§120, 365 to the previously filed Japanese Patent Application No. JP2012-047446 with a priority date of Mar. 3, 2012, which is incorporated by reference herein.

BACKGROUND OF THE INVENTION

1. Technical Field

The present invention relates to a technique for reducing power consumption of a processor in general, and more particularly to a technique for reducing power consumption of a processor while suppressing a degradation of the performance thereof.

2. Description of Related Art

A central processing unit (CPU), which is an essential processor in a computer, and a graphics processing unit (GPU), which performs graphical processing, consume more power than other devices. The power consumed by a CPU increases in approximately proportional to the clock frequency at which the CPU operates. A laptop personal computer (laptop PC) uses an AC/DC adapter or a battery pack as a power source for normal operation. Rated output power has been set for each of the battery pack and the AC/DC adapter.

Conventionally, some form of control is utilized to reduce the clock frequency of a CPU or GPU when the power consumption of a laptop PC has exceeded a certain value. For example, a throttle control can be used to reduce the clock frequency of a CPU when the power consumption has exceeded a threshold value. Alternatively, the clock rate of a CPU can be lowered when the power consumption has exceeded a predetermined value. Another method for suppressing a degradation of the performance of a processor is to measure the consumed power and temperature of the processor and, when they have exceeded threshold values, the maximum operating frequency is reduced in a stepwise manner.

Although the power consumption of a CPU decreases as the clock frequency is reduced, the performance also decreases. In the case of controlling the clock frequency of a CPU in order to keep the discharge current of a battery below an allowable value, it is desirable to restrict the reduction of the clock frequency to the least possible extent while keeping the discharge current below the allowable value. With the conventional clock frequency control methods, the clock frequency was reduced when the power consumption exceeded a threshold value. The control system of this type is a closed loop but belongs to the category of sequence control. The controlled variable is binary with respect to a threshold value, and the operation to be controlled is binary as well, which would lead to an excessive degradation of the performance.

Consequently, it would be desirable to provide an improved method for controlling the clock frequency while suppressing the performance degradation.

SUMMARY OF THE INVENTION

In accordance with a preferred embodiment of the present disclosure, a processor receives power from a battery to operate at a high clock frequency HFM(f) or a low clock frequency LFM(f). An allowable current Im is set for the discharge current of the battery. The time during which the processor operates at the HFM(f) and the time during which the processor operates at the LFM(f) are controlled by PWM. As the feedback current Ifb increases, the time during which the processor operates at the LFM(f) become longer than the time during which the processor operates at the HFM(f). This can improve the performance in comparison with the case of using a fixed threshold value for switching between the operation at the HFM(f) and the operation at the LFM(f).

All features and advantages of the present disclosure will become apparent in the following detailed written description.

BRIEF DESCRIPTION OF THE DRAWINGS

The disclosure itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
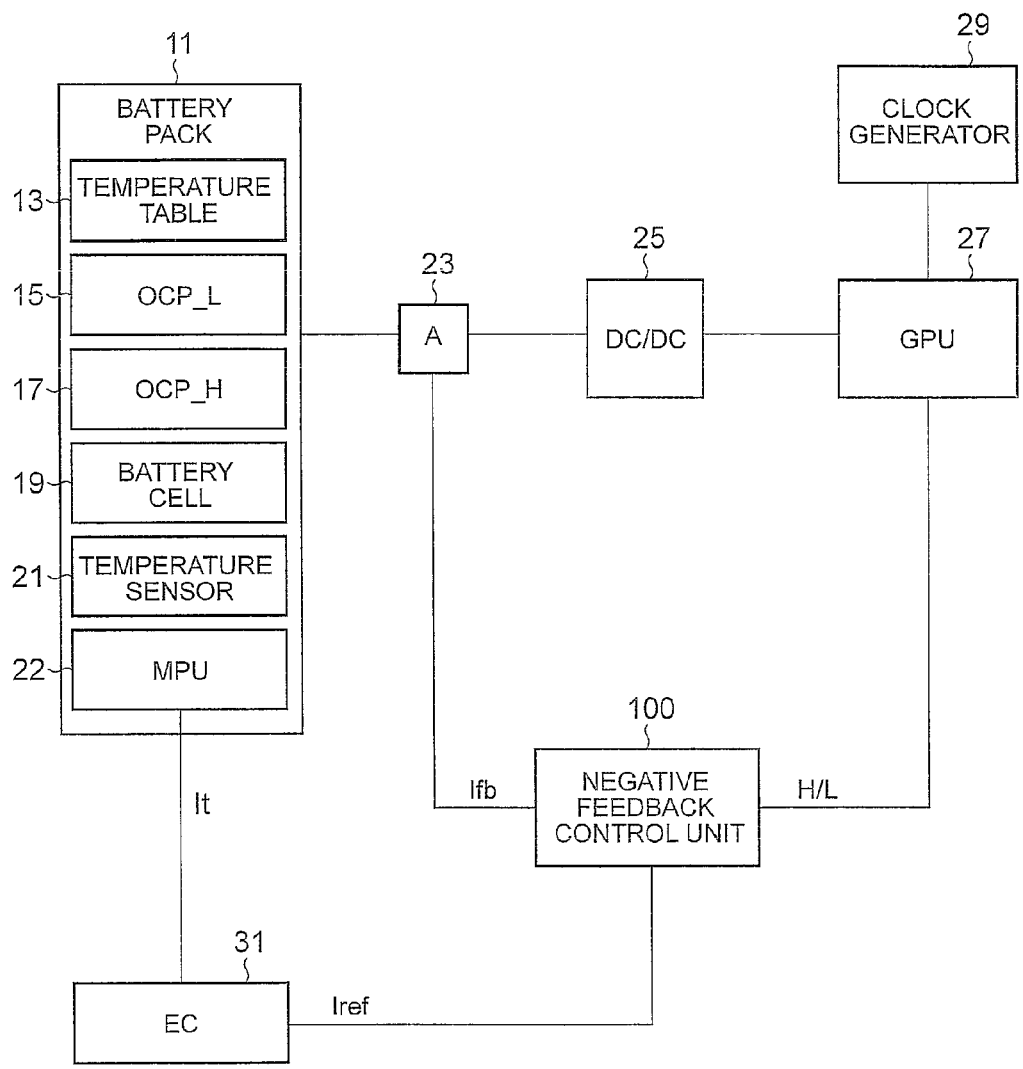
FIG. 1 is a block diagram of a clock frequency control system within a laptop PC.

FIG. 1 is a block diagram of a clock frequency control system 10 installed in a laptop PC. A battery pack 11, which is compliant with the smart battery system (SBS) specification, is housed in a battery bay of the laptop PC, and functions as a power source of the laptop PC together with an AC/DC adapter (not shown). The battery pack 11 includes a temperature table 13, a long-time overcurrent protective circuit (OCP_L) 15, a short-time overcurrent protective circuit (OCP_H) 17, a battery cell 19, a temperature sensor 21, an MPU 22, and other well-known components.

Figure 3:
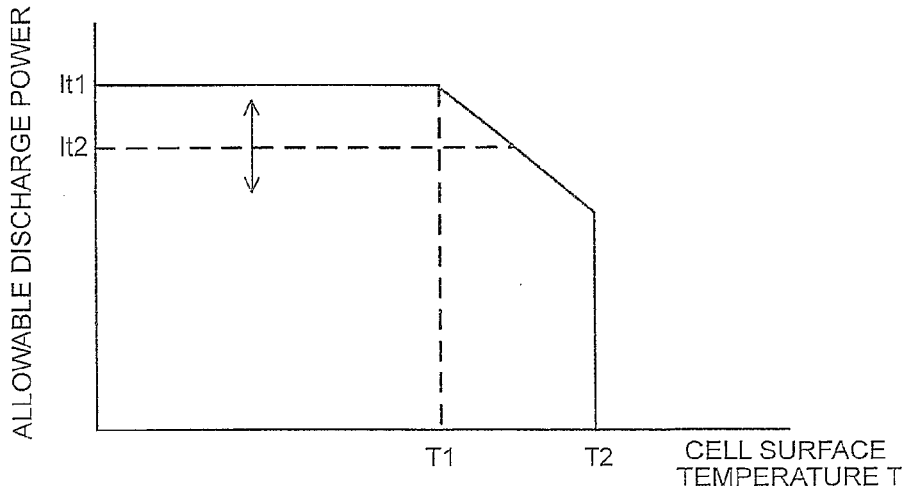
FIG. 3 shows a configuration of a temperature table.

The temperature table 13 is data which defines an allowable value of discharge power with respect to a surface temperature of the battery cell 19. The temperature table 13 is recorded on a non-volatile memory of the MPU 22. FIG. 3 shows a configuration of the temperature table 13. There is no restriction on the allowable discharge power as long as the surface temperature T is not higher than a threshold value T1 (T≤T1). When the surface temperature T exceeds the threshold value T1, it is necessary to reduce the discharge power in accordance with the increase of the surface temperature T, so as to ensure the safety during discharge.

The table in FIG. 3 indicates that while the surface temperature is between T1 and T2, the allowable discharge power is decreased in accordance with a monotonically decreasing function, and that when the surface temperature exceeds T2, the discharge needs to be stopped. The MPU 22 periodically calculates a target current value It for keeping the discharge current below an allowable value, on the basis of the temperature table and a temperature detected by the temperature sensor 21. When the battery cell temperature T is T1 or below (T≤T1), the MPU 22 sets a fixed target current value It1 in a register. When the battery cell temperature T is higher than T1 (T>T1), the MPU 22 sets in the register a variable target current value It2 which is determined in accordance with the cell temperature T.

Returning to FIG. 1, the OCP_L 15, which is composed of a switch circuit and firmware executed by the MPU 22, is a protective circuit that stops the discharge from the battery cell 19 when the discharge current exceeds a set value Im for more than four consecutive seconds, for example. The OCP_H 17, which is composed of hardware, is a protective circuit that stops the discharge from the battery cell 19 when the discharge current exceeds a set value Is (Is>Im) for more than 12 consecutive milliseconds, for example. In the present embodiment, the values Im and Is are set as fixed values to conform to the specification of the battery cell.

While the battery cell 19 is a lithium-ion battery cell by way of example, the present invention is applicable to any type of battery cells. The temperature sensor 21 measures the surface temperature of the battery cell 19. The MPU 22 controls the charging and discharging operations of the battery pack 11, calculates the remaining capacity, and communicates with an embedded controller (EC) 31. The MPU 22 also sets a set value of the charge current in a register.

A sense resistor 23 converts the discharge current which is supplied from the battery pack 11 to a GPU 27, to a voltage. A DC/DC converter 25 converts the voltage output from the battery pack 11 to a predetermined voltage, and supplies electric power to the GPU 27. A clock generator 29 transmits a base clock of, for example, 27 MHz to the GPU 27. The GPU 27 processes image data which is displayed on a display (not shown) of the laptop PC. The GPU 27 generates an internal clock from the base clock, to operate in an operating mode of either a high-frequency mode (HFM) or a low-frequency mode (LFM). Alternatively, the GPU 27 may operate at a plurality of discrete clock frequencies. For example, the clock frequency in the HFM (HFM(f)) is 1,080 MHz, and the clock frequency in the LFM (LFM(f)) is 270 MHz.

The EC 31 includes a microprocessor operating independently of the CPU of the laptop PC. The EC 31 is connected to a chip set (not shown) via an LPC bus, and performs the power management and the temperature management of the laptop PC. The EC 31 is connected to the battery pack 11 via an SM bus, and periodically receives a target current value It from the register of the battery pack 11 and sets a reference signal Iref in the negative feedback control unit 100.

The negative feedback control unit 100 is connected to the GPU 27, the sense resistor 23, and the EC 31. The negative feedback control unit 100 outputs an actuating signal H/L to cause the GPU 27 to operate in the operating mode of either the HFM or the LFM, on the basis of the feedback current Ifb detected by the sense resistor 23 and the reference signal Iref set by the EC 31. The GPU 27 operates in the LFM during the time when it receives the actuating signal H, and the GPU 27 operates in the HFM during the time when it receives the actuating signal L or it receives no actuating signal H. Alternatively, it may be configured such that the GPU 27 operates in the LFM during the time when it receives the actuating signal L, and the GPU 27 operates in the HFM during the time when it receives the actuating signal H or it receives no actuating signal L.

The power consumed by the GPU 27 is proportional to the clock frequency (the real clock frequency) at which the GPU 27 operates actually. The HFM(f) and the LFM(f) are the real clock frequencies. When the feedback current Ifb exceeds a predetermined value, the negative feedback control unit 100 switches the operating mode between the HFM and the LFM. The time period during which the GPU 27 operates in the HFM will be referred to as "HFM period", and the time period during which the GPU 27 operates in the LFM will be referred to as "LFM period".

The negative feedback control unit 100 changes the value of the LFM period/(the HFM period+the LFM period) so as to be inversely proportional to the magnitude of the feedback current Ifb, where the HFM period+the LFM period is constant. At this time, the clock frequency of the GPU 27 decreases, in a "pseudo" manner, so as to be inversely proportional to the magnitude of the feedback current. Here, the term "pseudo" means the representation from the standpoint of the power consumption and performance of the GPU 27, and the clock frequency which varies in the pseudo manner will be referred to as "pseudo clock frequency." The negative feedback control unit 100 performs pulse width modulation (PWM) control on the HFM and the LFM to cause the GPU 27 to operate at a pseudo clock frequency. The power consumed by the GPU 27 is also proportional to the pseudo clock frequency.

Figure 2A:
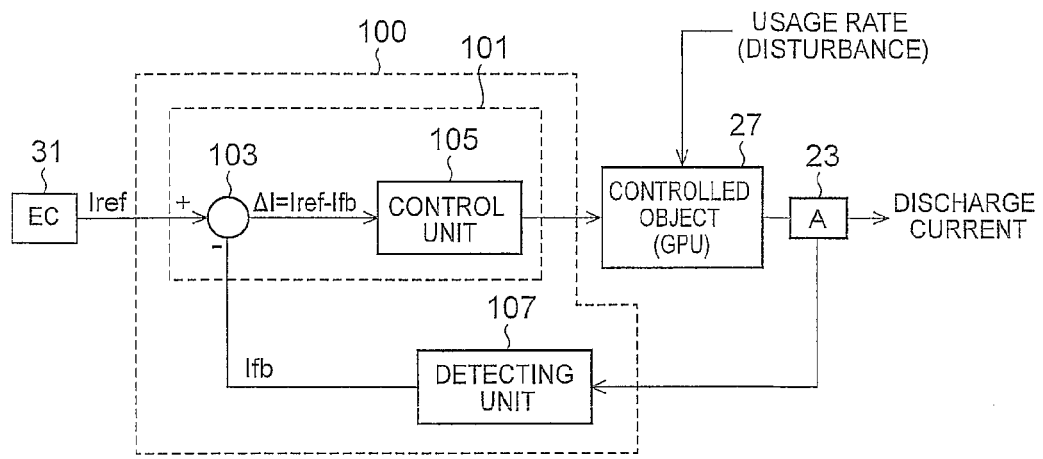
FIGS. 2A-2B are block diagrams of a negative feedback control unit within the laptop PC from FIG. 1.
Figure 2B:
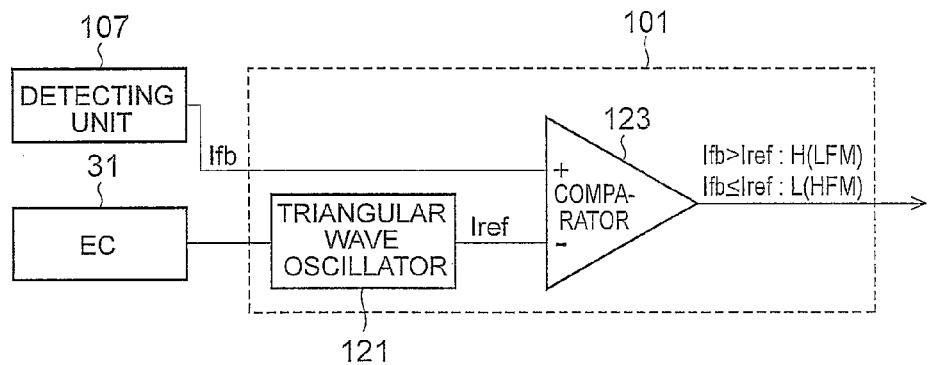

FIGS. 2A and 2B are block diagrams of the negative feedback control unit 100. As shown in FIG. 2A, the negative feedback control unit 100 includes a comparing unit 103, a control unit 105, and a detecting unit 107. While the negative feedback control unit 100 processes the physical quantity on the basis of voltage, here, the description will be made on the basis of current for simplicity's sake. The comparing unit 103 detects a difference ΔI between the reference signal Iref, as a target value, and the feedback current Ifb, output from the detecting unit 107, and transmits the detected difference ΔI as an operating signal to the control unit 105. The control unit 105 generates an actuating signal H/L from the operating signal, and transmits the generated signal H/L to the GPU 27 which is to be controlled.

The detecting unit 107 generates a feedback current Ifb by converting the discharge current of the battery cell 19, which is the controlled variable, to the physical quantity that can be compared with the reference signal Iref. The power consumed by the GPU 27 varies depending, not only on the real clock frequency, but also on the usage rate indicating the execution ratio between the idle processes and the processing instructions. The usage rate increases with an increase of the load of the GPU. With the same usage rate, the discharge current of the battery cell 19 varies depending on the variation of the real clock frequency. The change of the usage rate acts on the control system as the disturbance to the discharge current or the power consumption of the GPU 27. It is noted that the disturbance may also be caused by the variation of the power consumed by a device other than the GPU 27.

As shown in FIG. 2B, in the present embodiment, a comparison control unit 101, including the comparing unit 103 and the control unit 105, is composed of a triangular wave oscillator 121 and a comparator 123. The comparator 123 compares the feedback current Ifb with the reference signal Iref, and outputs the actuating signal H when Ifb>Iref, and outputs the actuating signal L when Ifb≤Iref. The GPU 27 operates in the LFM during the time when it receives the actuating signal H, and the GPU 27 operates in the HFM during the time when it receives the actuating signal L or it receives no actuating signal H.

The triangular wave oscillator 121 generates a reference signal Iref of triangular wave with the frequency of, for example, 25 KHz. As the frequency of the reference signal Iref is increased, the pulse width of the actuating signal is shortened, hindering the GPU 27 from switching the operating mode. On the other hand, as the frequency of the reference signal Iref is reduced, the process becomes similar to the control method using a fixed threshold value, leading to a decrease of the effect of improving the performance by the PWM control. Moreover, in order to prevent noise due to the vibrations of the substrate, ceramic capacitor, etc., it is necessary to set the frequency of the reference signal Iref so as not to fall within the audible frequency range. The frequency of the reference signal Iref is determined in consideration of the above-described factors. A peak-to-peak value (P-P value) of the reference signal Iref can be determined on the basis of the set value Im of the OCP_L 15 and the characteristics of the control system. The center value of the reference signal Iref is set, by the EC 31, to match the target current value It.

Figure 4:
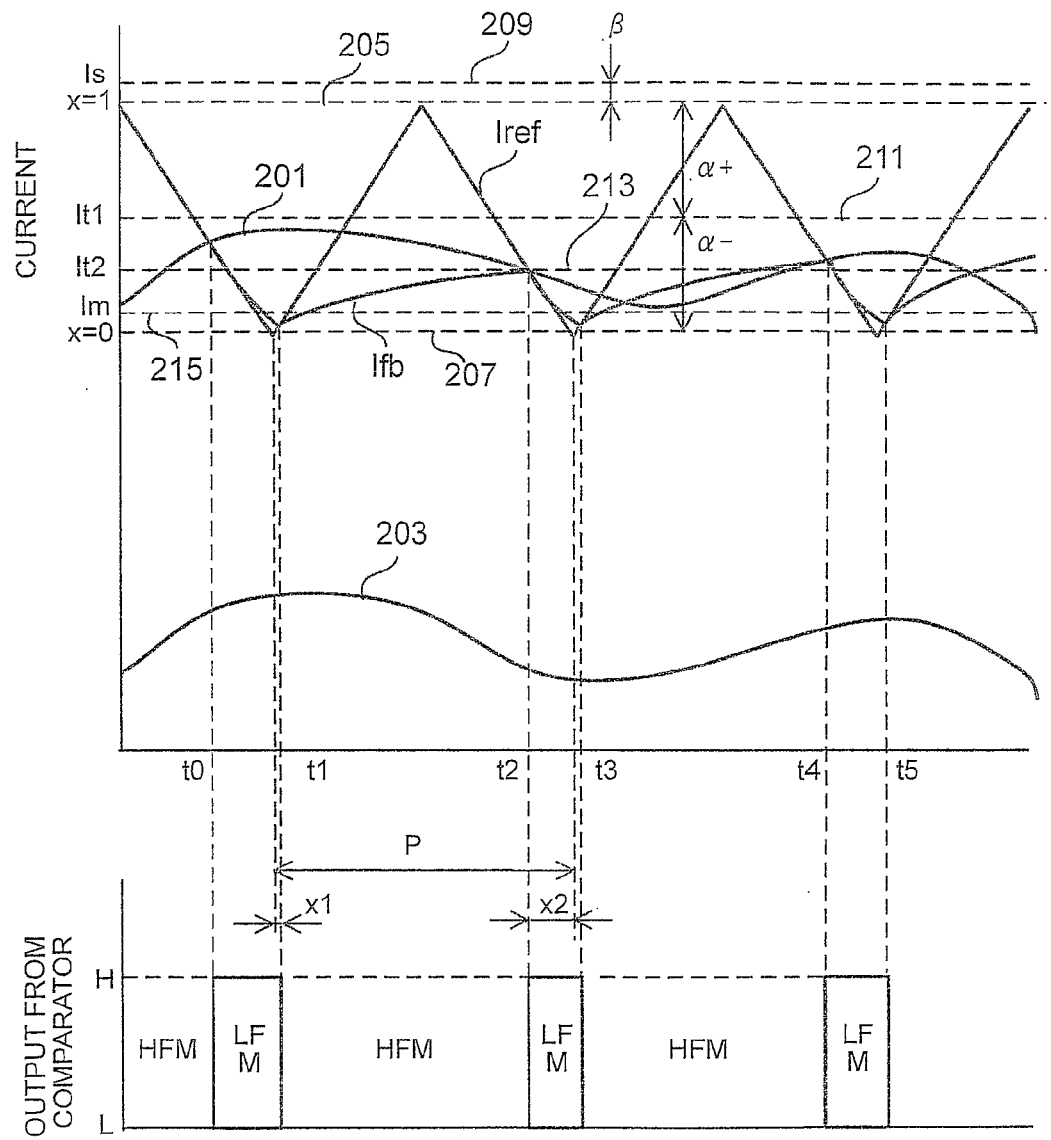
FIG. 4 illustrates the operation of the negative feedback control unit from FIGS. 2A-2B.

FIG. 4 illustrates the operation of the negative feedback control unit 100 when it performs the PWM control on the real clock frequency of the GPU 27 to cause the GPU 27 to operate at a pseudo clock frequency. A line 209 shows the set value Is of the OCP_H 17. A line 205 corresponds to the maximum value of the reference signal Iref of triangular wave, and a line 207 corresponds to the minimum value of the reference signal Iref. The P-P value of the reference signal Iref is held in the battery pack 11. A line 211 is the center value of the reference signal Iref, and corresponds to the target current value It1 at the time when T≤T1. A line 213 shows a new target current value It2. A line 215 shows the set value Im of the OCP_L 15.

A line 201 shows the discharge current of the battery cell 19 when the GPU 27 operates continuously at the usage rate of less than the maximum value and in the HFM. A line 203 shows the discharge current of the battery cell 19 when the GPU 27 operates continuously at the same usage rate as in the line 201 but in the LFM. The lines 201 and 203 correspond to a virtual discharge current at the time when the negative feedback control unit 100 performs no feedback control.

There is a residual error α+ between the target current value It1 and the line 205, and there is a residual error α− between the target current value It1 and the line 207. The target current value It1 is set such that there is a margin β between the set value Is and the line 205. When the feedback control is performed on the virtual discharge current shown by the line 201, the feedback current Ifb is generated as follows. Prior to time t0, Ifb≤Iref. Thus, the comparator 123 outputs the actuating signal L, causing the GPU 27 to operate in the HFM.

At time t0, Ifb exceeds Iref, so that the comparator 123 outputs the actuating signal H, causing the GPU 27 to switch to the LFM. Herein, the operation that the comparator 123 outputs the actuating signal H to cause the GPU 27 to switch to the LFM during the time when Ifb>Iref will be referred to as "clipping." As the electric power system includes capacitance and inductance components, the clipped feedback current Ifb decreases to almost reach the line 207 so as to approach the discharge current shown by the line 203 from time t0 to time t1. At time t1, Ifb becomes Iref or smaller (Ifb≤Iref), so that the clipping is released, causing the GPU 27 to operate in the HFM. The feedback current Ifb gradually increases to approach the discharge current shown by the line 201 from time t1 to time t2. Thereafter, the operating mode of the GPU 27 is similarly switched at times t3, t4, and t5, so that the virtual discharge current shown by the line 201 is controlled to the feedback current Ifb.

At this time, in one period P of the reference signal Iref, the actuating signal H is output during the time x1+x2=x. The value obtained by calculating x/P is the duty x of the comparator 123. The average clock frequency per one period of the GPU 27, i.e. the pseudo clock frequency CLK, can be calculated by the following expression:

$$CLK = LFM(f) \times x + HFM(f) \times (1-x)$$

When the feedback current Ifb which is assumed to be direct current matches the line 205, x is equal to 1 (x=1). When the feedback current Ifb matches the line 207, x is equal to 0 (x=0). The pseudo clock frequency CLK has the characteristic that it is proportional to the performance and the power consumption of the GPU 27. The average of the feedback current Ifb with respect to the virtual discharge current shown by the line 201 is determined by the frequency of the reference signal Iref, the P-P value, the power consumed by the GPU 27 at the HFM(f) and at the LFM(f), the AC component included in the feedback current Ifb, the reactance of the power source system, and so on.

During the time when the reference signal Iref is clipping the feedback current Ifb, x is in the range of 0<x<1. With an increase of the virtual discharge current 201, the average of the feedback current Ifb increases, but the increase is slow because x also increases. With a further increase of the virtual discharge current 201, the reference signal Iref continuously clips the feedback current Ifb, so that x becomes 1 (x=1), and the GPU 27 operates in the LFM continuously. Every time the feedback current Ifb is clipped, it decreases to the level near the line 207. Thus, the OCP_L 15 is not activated even if the set value Im is set near x=0. When the usage rate of the GPU 27 becomes small and the reference signal Iref completely ceases to clip the feedback current Ifb, x becomes 0 (x=0), and the GPU 27 operates in the HFM constantly.

Even in the case of using an on/off control system in which the GPU 27 is caused to operate in the LFM when the discharge current exceeds a predetermined upper limit and the GPU 27 is returned to the HFM when the discharge current becomes less than a predetermined lower limit that has been set with hysteresis, it is possible to control the operation of the GPU 27 to prevent actuation of the OCP_L 15. As opposed to this control system, the negative feedback control unit 100 provides a time period during which the feedback current Ifb is controlled by the pseudo clock frequency, which can suppress the degradation of the performance, as will be described later in conjunction with FIGS. 7A and 7B. Further, in the on/off control system, even when the load of the GPU 27 increases only for a short time, once the operating mode is switched to the LFM, it takes time for the GPU 27 to transfer to the HFM after the load of the GPU 27 becomes light. In contrast, in the negative feedback control unit 100, the pseudo clock frequency is changed continuously with an increase or decrease of the load. This can further suppress the performance degradation.

When the cell temperature T exceeds T1 (T>T1), the MPU 22 sets a new target current value It2 corresponding to the cell temperature T, in the register. The EC 31 refers to the register periodically to acquire a new target current value It2. When the EC 31 acquires a target current value different from the previously acquired target current value It, the EC 31 changes the setting of the triangular wave oscillator 121. Specifically, the EC 31 changes the setting of the triangular wave oscillator 121 in the case where at least one of the previous and current target current values It was set when the cell temperature T was higher than T1 (T>T1).

The EC 31 translates the center value of the reference signal Iref so as to match the new target current value It2. The new reference signal Iref having the center value matching the target current value It2 (It2<It1) has a greater value of x with respect to the same discharge current 201, causing the GPU 27 to operate in the LFM for a longer time. As a result, the average of the feedback current Ifb become smaller. The target current value It2 and the feedback current Ifb are changed with an increase or decrease of the temperature of the battery cell 19, which can ensure the safety of the battery cell 19 based on the characteristics set in FIG. 3.

Figure 5A:
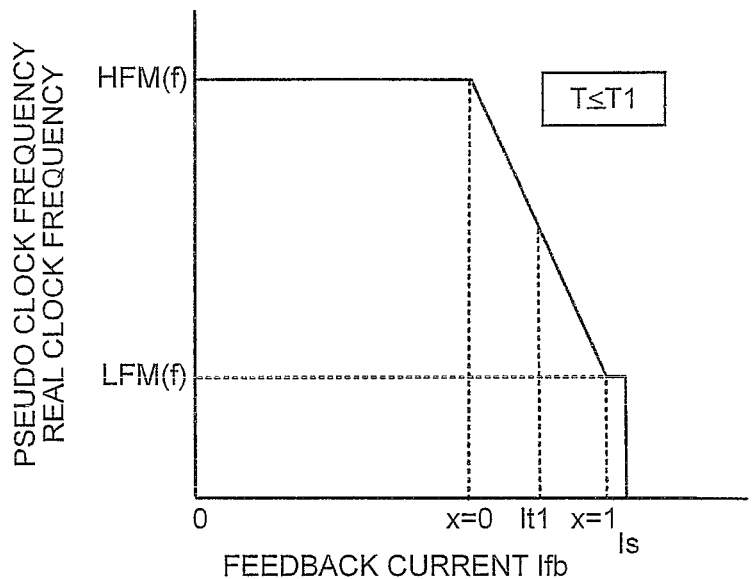
FIGS. 5A-5B each show the relationship between a target current value and the clock frequency.
Figure 5B:
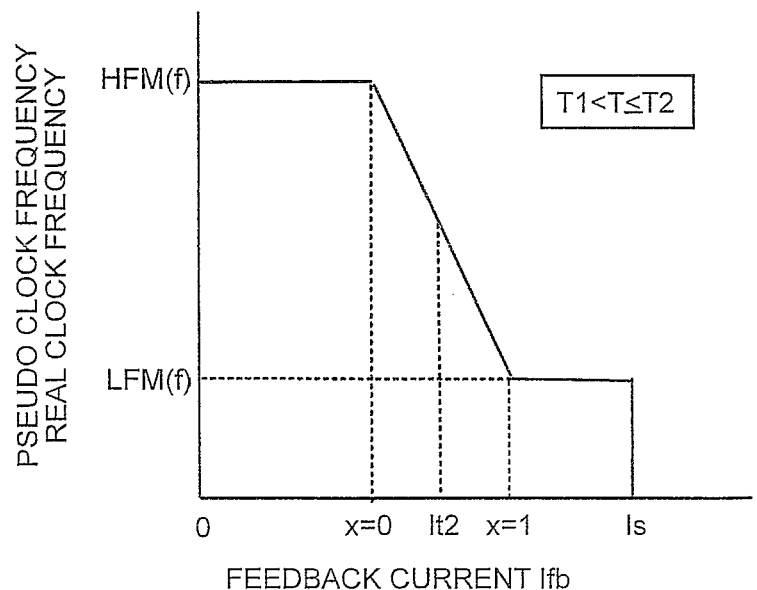

In FIGS. 5A and 5B, the operation illustrated in FIG. 4 is shown as the relationship between a target current value and the clock frequency. FIG. 5A shows the operation in the case where the cell temperature T is T1 or below (T≤T1), while FIG. 5B shows the operation in the case where the cell temperature T is in the range of T1<T≤T2. In FIG. 5A, Iref having its center value matching the target current value It1 is set, and the GPU 27 operates at the real clock frequency HFM(f) when the feedback current Ifb is smaller than the value corresponding to x=0. While the feedback current Ifb is being controlled in the range of 0<x<1, the pseudo clock frequency CLK decreases inversely with the value of x. When the feedback current Ifb is larger than the value corresponding to x=1, the GPU 27 operates at the real clock frequency LFM(f). In FIG. 5B, Iref having its center value matching the target current value It2 (It2<It1) is set, and the range in which the GPU 27 operates at the pseudo clock frequency is translated in the direction in which the feedback current Ifb decreases.

Figure 6:
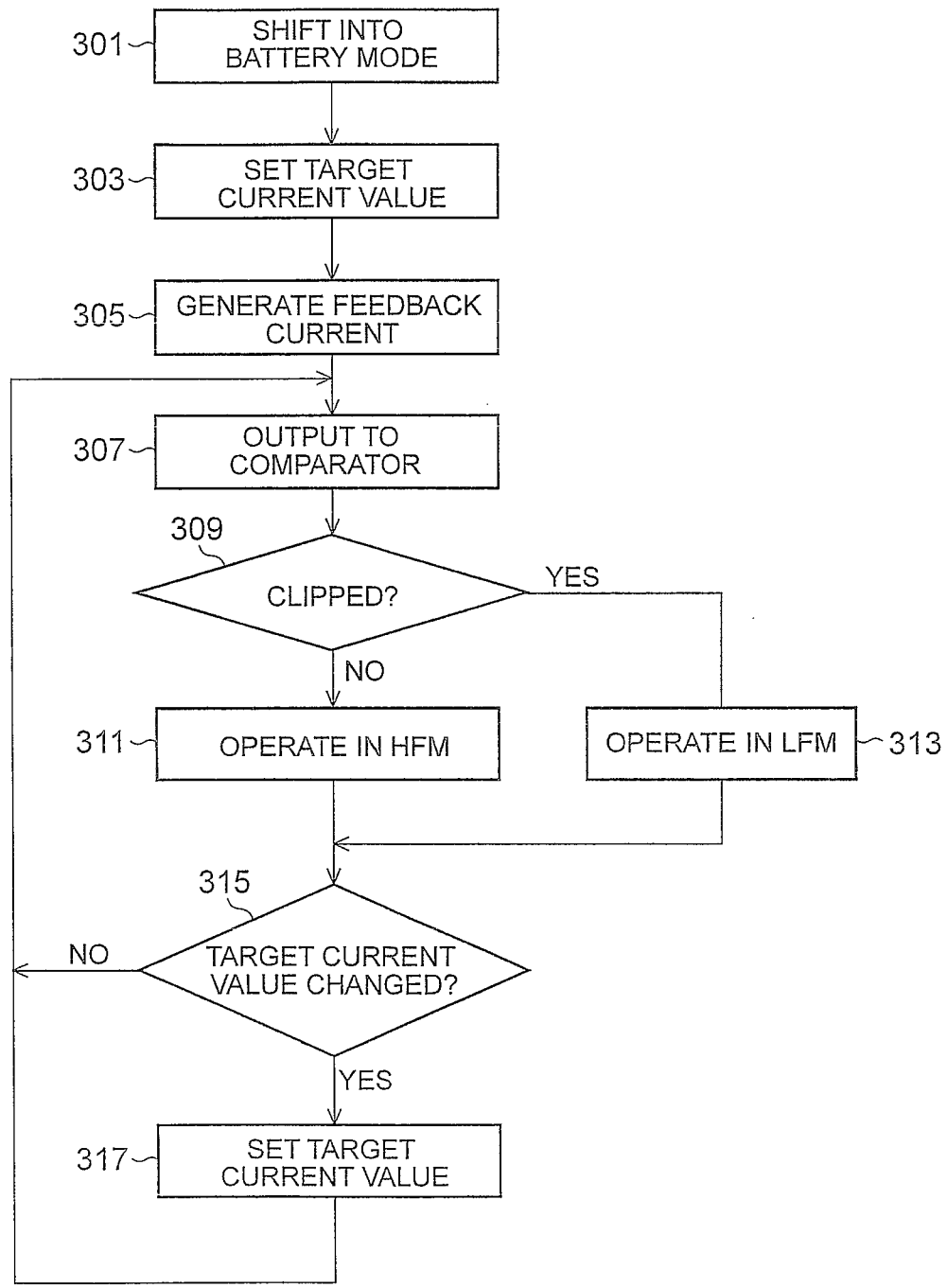
FIG. 6 is a flowchart illustrating the operational procedure of the clock frequency control system from FIG. 1.

FIG. 6 is a flowchart illustrating the operational procedure of the clock frequency control system 10. In block 301, the laptop PC with an AC/DC adapter removed therefrom commences an operation using the battery pack 11 as a power source. At first, the surface temperature T of the battery cell 19 is not higher than T1 (T≤T1), and the GPU 27 is operating in the HFM or the LFM. In block 303, the MPU 22 sets a target current value It1 in the register.

The EC 31 acquires the target current value It1 at a predetermined interval from the register of the battery pack 11. The EC 31 sets a reference signal Iref1 in the triangular wave oscillator 121 on the basis of the target current value It1 acquired from the battery pack 11. In block 305, the detecting unit 107 generates a feedback current Ifb on the basis of the output from the sense resistor 23. In block 307, the feedback current Ifb is input from the detecting unit 107 to the positive terminal of the comparator 123, while the reference signal Iref1 is input from the triangular wave oscillator 121 to the negative terminal of the comparator 123.

In block 309, the comparator 123 compares the magnitudes of the instantaneous value of the feedback current Ifb and the instantaneous value of the reference signal Iref1. If Ifb>Iref1, in block 313, the reference signal Iref1 clips the feedback current Ifb, and the comparator 123 outputs the actuating signal H. As a result, the GPU 27 operates in the LFM. If Ifb≤Iref1, in block 311, the comparator 123 outputs the actuating signal L. As a result, the GPU 27 operates in the HFM, with the feedback current Ifb not being clipped.

In block 315, the EC 31 determines whether the target current value It has been changed from the previous value. If the target current value has not been changed, the process returns to block 307 and proceeds to block 309, and the GPU 27 operates in the HFM or the LFM. In the operational procedure up to then, the pseudo clock frequency or the real clock frequency of the GPU 27 changes as shown in FIG. 5A. In block 315, when at least one of the previous and current cell temperatures T was higher than T1 (T>T1), the target current value may have been changed.

If the target current value has been changed, in block 317, the EC 31 acquires a new target current value It2 from the battery pack 11, and sets a reference signal Iref2 in the triangular wave oscillator 121. Thereafter, the process proceeds as described previously. When the reference signal Iref2 is shifted downward, the pseudo clock frequency corresponding to the same feedback current Ifb decreases in the range of 0<x<1, whereas when the reference signal Iref2 is shifted upward, the pseudo clock frequency increases.

Figure 7A:
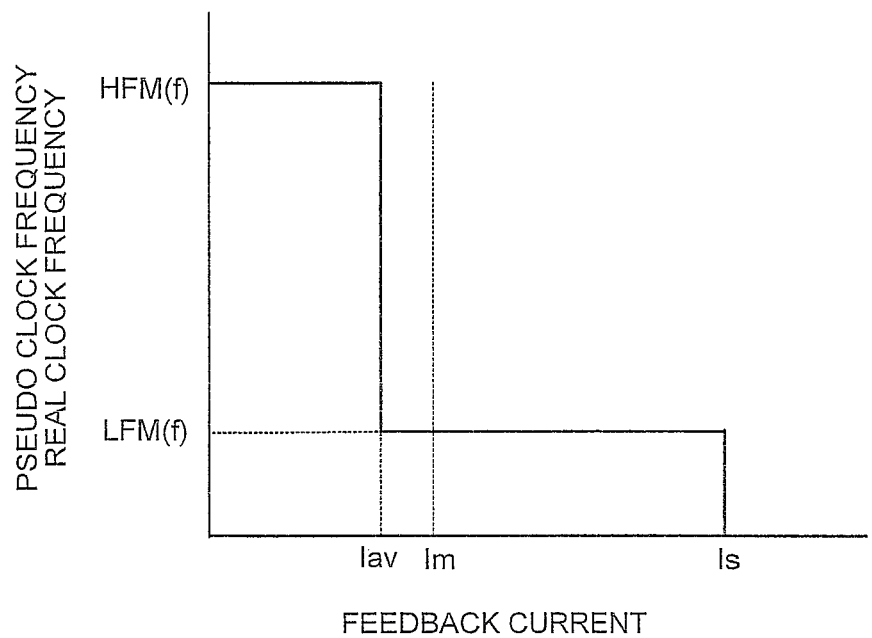
FIGS. 7A-7B illustrate the performance of a GPU by the clock frequency control system from FIG. 1 in comparison with that by an on/off control system.
Figure 7B:
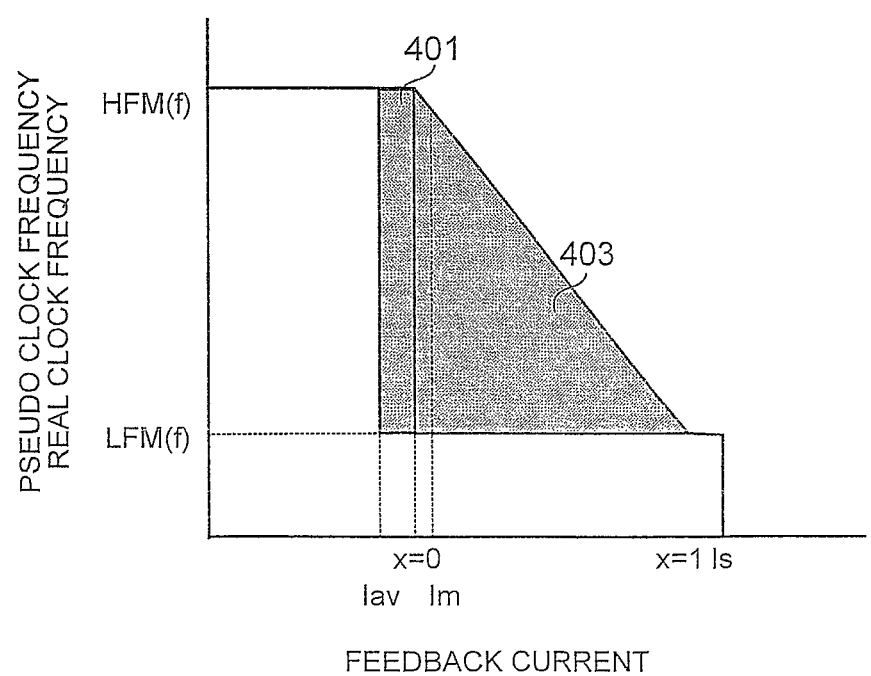

FIGS. 7A and 7B illustrate the clock frequency control system (the PWM control system) according to the embodiment of the present invention, in comparison with the on/off control system. FIG. 7A shows the operating modes in the on/off control system, while FIG. 7B shows the operating modes in the PWM control system. In the case where the real clock frequency of the GPU 27 is controlled to one of the HFM(f) and the LFM(f) in the on/off control system, it is necessary to provide hysteresis between a switching value Isw1 for the feedback current for switching from the LFM(f) to the HFM(f), and a switching value Isw2 for the feedback current for switching from the HFM(f) to the LFM(f). Further, as to the switching value Isw1, it is necessary to set a predetermined margin with respect to the set value Im so as to prevent the OCP_L 15 from being activated due to a delay of the control even if the load of the GPU 27 operating in the HFM increases abruptly.

In the on/off control system, as shown in FIG. 7A, it can be said that, because of the hysteresis between the switching values Isw1 and Isw2, the GPU 27 operates in the HFM when the feedback current is substantially smaller than the center value Iay thereof, while the GPU 27 operates in the LFM when the feedback current is larger than the center value Iay. In contrast, in the PWM control system, as shown in FIG. 7B, while the GPU 27 operates at the HFM(f) when x<0, in the range of 0<x<1, the pseudo clock frequency decreases inversely with x, and the GPU 27 operates at the LFM(f) when x=1. Therefore, areas 401 and 403 in the figure correspond to the range in which the PWM control system can control the GPU 27 while ensuring higher performance than in the on/off control system when the feedback current increases.

Here, a consideration is given to the AC component that is superimposed on the feedback current in the state of feedback control where the feedback current Ifb is clipped by the reference signal Iref. Referring to FIG. 4, when the feedback current Ifb agrees with the line 207, the feedback current Ifb is not clipped, so that the GPU 27 operates in the HFM continuously. Further, when the feedback current Ifb agrees with the line 205, the feedback current Ifb is clipped over the entire time period of the reference signal Iref, so that the GPU 27 operates in the LFM continuously. If the feedback current Ifb includes no AC component, the feedback current Ifb during the feedback control will fall within the P-P value of the reference signal Iref. In this case, there is a difference between the target current value It and the feedback current Ifb by the residual errors α+, α−.

Figure 8A:
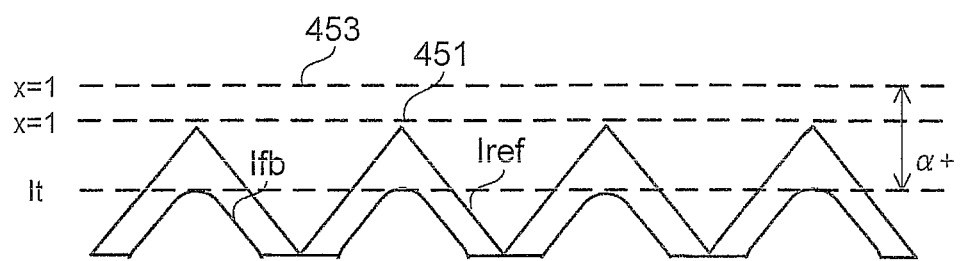
FIGS. 8A-8B illustrate the effects of an AC component superimposed on a feedback current.

Actually, the feedback current includes a variety of AC components. When the feedback current immediately before it is subjected to the feedback control includes an AC component, depending on the magnitude and frequency of the AC component as well as its phase relative to the reference signal, the residual errors $\alpha+$ and $\alpha-$ with respect to the average of the feedback current that has undergone the feedback control may become larger than in the case where the feedback current includes no AC component. When the feedback current Ifb at a certain moment during the feedback control includes an AC component that is in phase with the reference signal Iref as shown in FIG. 8A, the reference signal Iref completely ceases to clip the feedback current Ifb. As a result, the average of the feedback current Ifb that has undergone the feedback control becomes larger than that of the feedback current including no AC component.

Figure 8B:
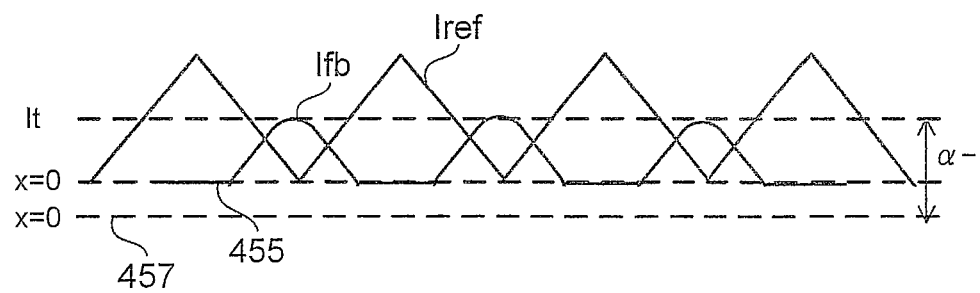

Around x=1, when the feedback current includes no AC component, it reaches a line 451 when x=1. When the feedback current includes an AC component, the average of that feedback current reaches a line 453 when x=1. This results in an increased residual error $\alpha+$. On the other hand, when the feedback current Ifb at a certain moment during the feedback control includes an AC component that is 180 degrees out of phase with the reference signal Iref as shown in FIG. 8B, the reference signal Iref clips the feedback current Ifb more excessively compared to the feedback current including no AC component. As a result, the average of the feedback current Ifb that has undergone the feedback control becomes smaller than that of the feedback current including no AC component.

Around x=0, when the feedback current includes no AC component, it reaches a line 455 when x=0. When the feedback current includes an AC component, the average of that feedback current reaches a line 457 when x=0. This results in an increased residual error $\alpha-$. As such, the average of the feedback current Ifb including an AC component may have larger residual errors $\alpha+$ and $\alpha-$ in comparison with the feedback current including no AC component.

When the residual error $\alpha+$ becomes large, the OCP_H 17 may be activated. This can be addressed by lowering the target current value It and increasing the margin β. When the residual error $\alpha-$ becomes large, the average of the feedback current at which the clipping is started decreases, leading to a decrease of the effect of improving the performance. The feedback current actually includes AC components of various phases, allowing the residual errors $\alpha+$, $\alpha-$ to be canceled out, so that the performance degradation can be suppressed in comparison with the case of adopting the on/off control system. The residual error $\alpha+$ that is generated because the reference signal does not clip the feedback current as shown in FIG. 8A can be decreased by increasing the frequency of the reference signal as well. If the frequency of the reference signal is too high, however, it is not possible to adequately secure the pulse width of the actuating signal that is required for changing the operating mode of the GPU.

Figure 9A:
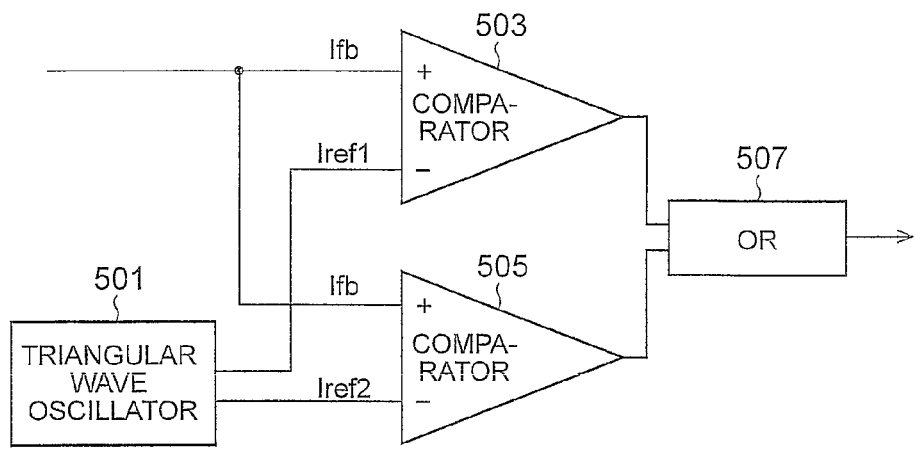
FIGS. 9A-9B show another configuration of a comparison control unit.
Figure 9B:
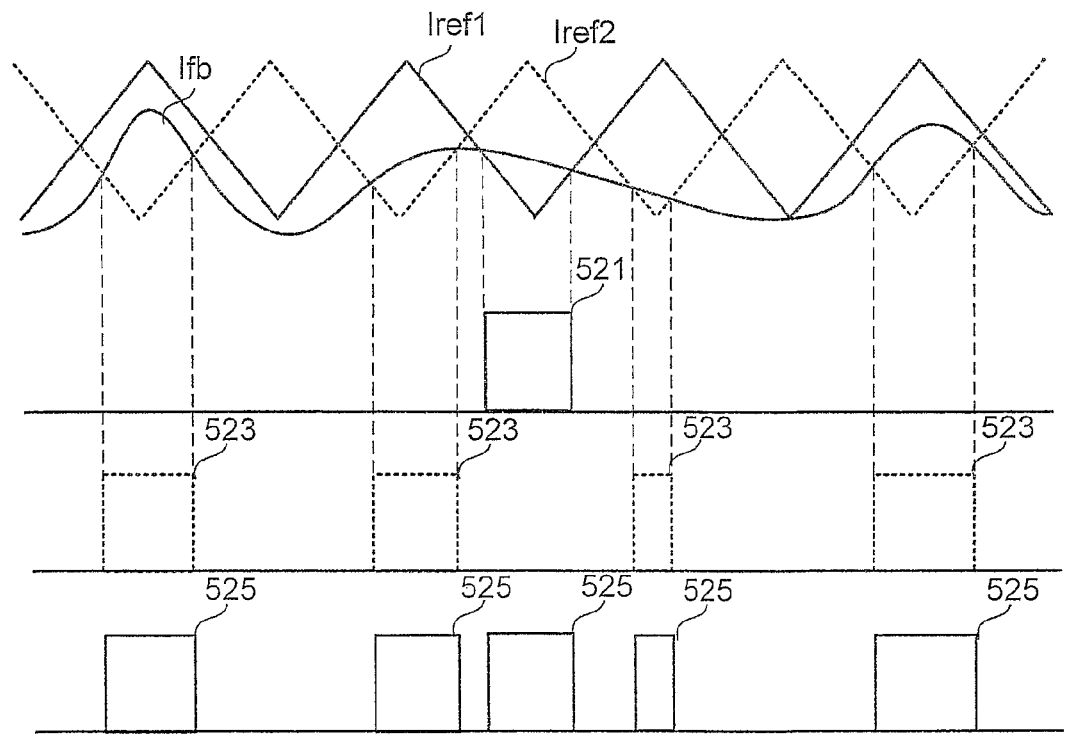

FIGS. 9A and 9B illustrate the configuration of a comparison control unit that can increase the probability of occurrence of clipping without increasing the frequency of the reference signal. FIG. 9A shows the configuration of the comparison control unit, and FIG. 9B shows an operating waveform. A triangular wave oscillator 501 outputs a reference signal Iref1 to the negative terminal of a comparator 503 and outputs a reference signal Iref2 to the negative terminal of a comparator 505. The reference signals Iref1 and Iref2 are 180 degrees out of phase with each other, and identical in frequency and P-P value to each other.

The feedback current Ifb is input to the positive terminals of the comparators 503 and 505. The outputs from the comparators 503 and 505 are output to an OR logic device 507. The output from the OR logic device 507 is connected as an actuating signal to the GPU 27. In response to the feedback current Ifb, the comparator 503 outputs an actuating signal 521 and the comparator 505 outputs an actuating signal 523, so that the OR logic device 507 outputs a synthesized actuating signal 525.

The comparators 503 and 505 are complementary to each other to clip the feedback current Ifb including AC components of various phases. Every time the comparators 503 and 505 perform clipping, they perform the PWM control on the HFM and the LFM. In comparison with the comparison control circuit having a single comparator, this comparison control circuit can decrease the residual error $\alpha+$ while securing the comparable pulse widths of the actuating signals. It is thus possible to further improve the performance by decreasing the margin β. The comparator 505 plays a supporting role for the comparators 503. Therefore, the reference signal Iref2 may be configured such that not only the phase is shifted by 180 degrees from that of the reference signal Iref1 but also the center value is shifted. Further, waveforms other than the triangular wave may be combined. Furthermore, three or more comparators may be connected in parallel with each other to use two or more supplementary reference signals.

While the present invention has been described above by restricting the controlled variable to the discharge current of the battery cell, the controlled variable of the present invention is not limited thereto. For example, some of the portable lightweight AC/DC adapters have the normal rated power that is smaller than the maximum power consumption of the system. In such a case, a control is carried out in which the clock frequency of the processor is reduced as the power consumed by the system increases. When the output current of the AC/DC adapter is adopted as the controlled variable, the output current of the AC/DC adapter can be kept below the allowable value while suppressing the degradation of the performance, by PWM-controlling the pseudo clock frequency similarly as in the above-described embodiment.

The negative feedback control unit 100 is also applicable to a control in which the temperature of the processor or the temperature inside the casing of the laptop PC is used as a controlled variable, and the clock frequency is reduced when the temperature increases so as to keep the temperature below the allowable value. Further, the negative feedback control unit 100 may be applied to a CPU instead of the GPU 27. The reference signal is not restricted to a triangular wave. The present invention may be applied to all AC signals in which x decreases with an increase of the feedback current.

As has been described, the present disclosure provides a method and apparatus for reducing the power consumption of the processor while suppressing a degradation of the performance thereof.

Those skilled in the art will appreciate that the mechanisms of the present invention are capable of being distributed as a program product in a variety of computer readable device such as compact discs and digital video discs.

While the disclosure has been particularly shown and described with reference to a preferred embodiment, it will be understood by those skilled in the art that various changes in form and detail may be made therein without departing from the spirit and scope of the disclosure.

What is claimed is:

1. An electronic apparatus comprising:
a battery pack, having a battery cell and a first processor, generates a target current value;
a second processor to be operated at one of a first clock frequency and a second clock frequency lower than said first clock frequency;
a sensor resistor, coupled to said battery pack, that converts a discharge current to a voltage, wherein said discharge current is supplied from said battery pack to said second processor;
an embedded controller sets a reference current in response to said target current value from said battery pack; and
a negative feedback control circuit, having a plurality of comparators, converts said reference current to a triangular wave reference current and compares said triangular wave reference current to a feedback current from said sensor resistor in order to generate an actuating signal to cause said second processor to operate at one of said first and second clock frequencies.

2. The electronic apparatus of claim 1, wherein said negative feedback control circuit generates said actuating signal to perform PWM control on a time during which said second processor operates at said first clock frequency and a time during which said second processor operates at said second clock frequency.

3. The electronic apparatus of claim 1, wherein said negative feedback control circuit includes
a triangular wave oscillator to convert said reference current to said triangular wave reference current; and
a comparator to compare said triangular wave reference current to said feedback current to generate said actuating signal.

4. The electronic apparatus of claim 1, wherein when said feedback current increases, the time during which said second processor operates at said second clock frequency becomes longer than the time during which said second processor operates at said first clock frequency.

5. The electronic apparatus of claim 1, wherein said negative feedback control circuit generates said actuating signal to cause said second processor to operate at said first clock frequency in response to said feedback current being lower than said triangular wave reference current.

6. The electronic apparatus of claim 5, wherein said negative feedback control circuit generates said actuating signal to cause said second processor to operate at said second clock frequency in response to said feedback current being higher than said triangular wave reference current.

* * * * *